United States Patent [19]

Brown

[11] Patent Number: 4,712,942

[45] Date of Patent: Dec. 15, 1987

[54] JOINT MAKER

[76] Inventor: Robert K. Brown, 416 S. Church St., Lockhart, Tex. 78644

[21] Appl. No.: 909,580

[22] Filed: Sep. 22, 1986

[51] Int. Cl.$^4$ ............................ F16D 1/00; F16B 1/00
[52] U.S. Cl. .................... 403/174; 403/178; 403/403; 403/231
[58] Field of Search ............... 403/205, 403, 231, 230, 403/174, 178

[56] References Cited

U.S. PATENT DOCUMENTS

| | | | |
|---|---|---|---|
| 3,989,397 | 11/1976 | Baker | 403/205 |
| 4,279,455 | 7/1981 | Santo | 312/330 R |
| 4,385,850 | 5/1983 | Bobath | 403/205 |
| 4,507,815 | 4/1985 | Danko | 403/403 X |

FOREIGN PATENT DOCUMENTS

| | | | |
|---|---|---|---|
| 2356033 | 1/1978 | France | 403/231 |
| 223272 | 11/1942 | Switzerland | 403/205 |
| 1421371 | 1/1976 | United Kingdom | 403/230 |

Primary Examiner—Andrew V. Kundrat
Attorney, Agent, or Firm—Hugh D. Jaeger

[57] ABSTRACT

Joint maker for the assembly of two or more pieces of stock about common interconnecting members. The joint maker includes a plurality of configured arms about common interconnecting members for either assembling stock at a right angle, or at other angles with respect to each other, whether there are two or more pieces of stock. The joint maker includes angularly inwardly extending cleats which extend from the arms, and arms extending from a common interconnecting member. Each of the cleats have an inwardly extending member.

7 Claims, 8 Drawing Figures

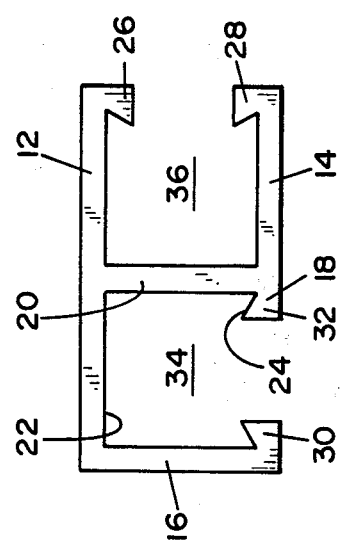

JOINT MAKER

BACKGROUND OF THE INVENTION

1. Field of the Invention

The present invention pertains to an apparatus for joining two or more pieces of stock, such as wood, together, and more particularly, pertains to joining two pieces of material together, such as right angled members of a drawer.

2. Description of the Prior Art

The prior art recognizes the joining of members of drawers together, such as by U.S. Pat. Nos. 4,279,455 and 4,344,661, as well as numerous other prior art patents such as U.S. Pat. Nos. 4,331,368, 4,286,831, 4,277,122, 4,108,520, 3,901,572, 3,877,765 and 4,036,542.

The present invention overcomes the disadvantages of the prior art by providing cleats in arms about a common interconnecting member which are angled inwardly providing for secure engagement between the cleats on the arms and each piece of stock.

SUMMARY OF THE INVENTION

The general purpose of the present invention is a joint maker for joining at least two pieces of stock, such as aluminum, plastic, wood, composite material, or the like, together at a right angle or any other plurality of angles as so may be desired.

According to one embodiment of the present invention, there is provided a joint maker which includes at least one common interconnecting member with first and second pair of arms extending therefrom, each end of each of the arms including an angled inwardly extending cleat at a substantially right angle thereto, and each of the cleats including an expanding section which angles inwardly providing for engagement with grooves in a stock member having a like pair of grooves therein. The grooves of the stock frictionally engage into the gap between the cleats, and likewise, the slots of the stock engage with the cleats of the joint maker providing for a firm and secure joint therebetween. The connecting member can be more than one member and can include a space and supporting arms at either a right angle, a parallel plane, or at an angle therebetween, and can join two or more pieces of stock.

Significant aspects and features of the joint maker of the present invention include a structure which can be extruded and cut to any length, and can be used to join two or more pieces of stock together.

Another significant aspect and feature of the joint maker of the present invention is for joining two members of a drawer together at a right angle.

A further significant aspect and feature of the joint maker of the present invention is being able to connect any number of members at any number of predetermined angles.

Having thus described embodiments of the present invention, there is provided a joint maker for joining two or more members together at predetermined angles as so desired.

BRIEF DESCRIPTION OF THE DRAWINGS

FIG. 2 is a top view of the joint maker;

DESCRIPTION OF THE PREFERRED EMBODIMENTS

Figure 1:
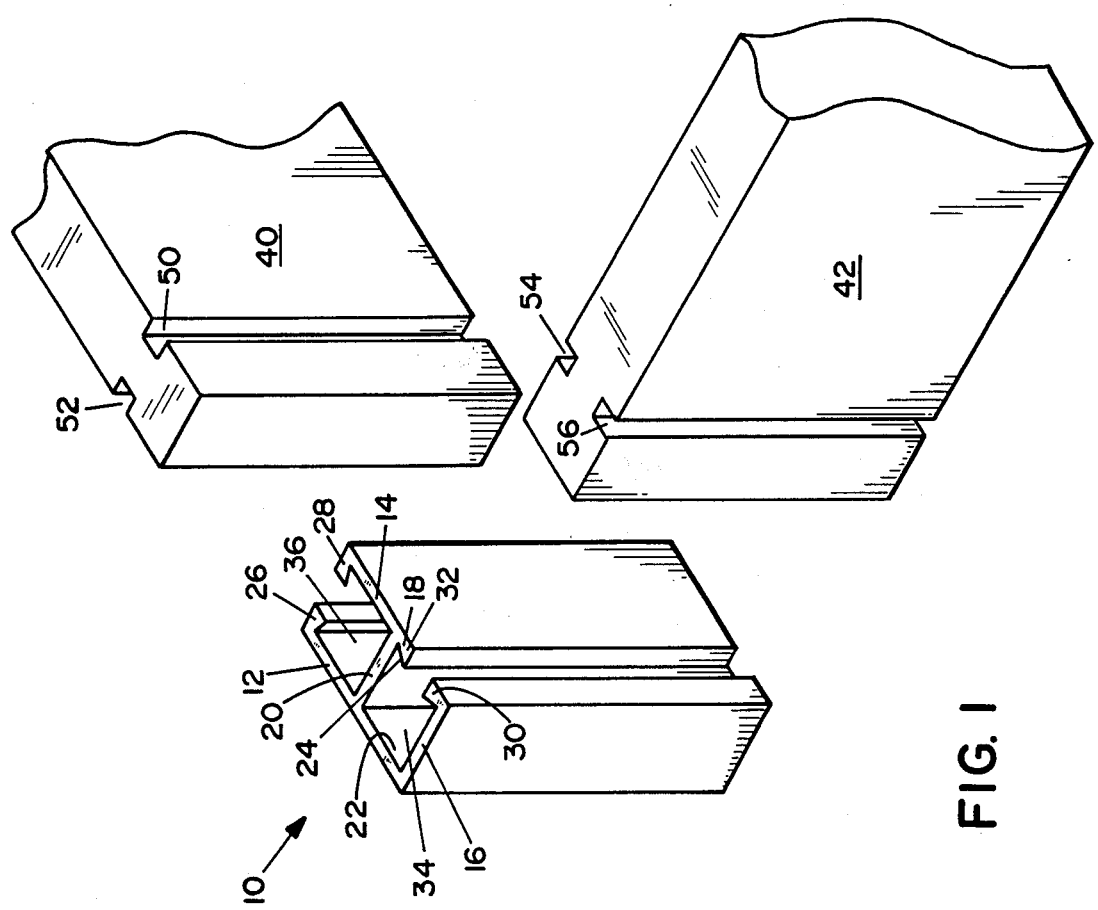
FIG. 1 is a perspective view of a joint maker, the present invention with two members of stock.

FIG. 1 illustrates a perspective view of the present invention, a joint maker 10. The joint maker 10 is of a resilient material, such as aluminum or like metal, extruded plastic, or any other appropriate material or composite material. The joint maker includes a pair of first arms 12 and 14, and a pair of second arms 16 and 18 where arm 16 is a right angle member. An interconnecting member 20 is connected to inner sides 22 and 24 for interconnecting the first pair of arms 12 and 14 and the second pair of arms 16 and 18. The height of stocks 40 and 42 to be joined, determine the length of the member 20 and of the arms 12, 14, 16 and 18. Each of the arms have angularly inwardly extending cleats 26, 28, 30 and 32 respectively, extending from the arms at substantially right angles or planar as illustrated. In the embodiment of FIGS. 1 the cleat 32 is constituent with the arm 18. Captured areas 34 and 36 are formed on each side of the interconnecting member 20. The joint maker 10 can be of any length as so required.

FIG. 2 illustrates a top view where all numerals correspond to those elements previously described.

MODE OF OPERATION

To effectuate the joining of the stock 40 and 42 by the joint maker 10, the cleats 26, 28, 30 and 32 are aligned with traverse vertical grooves 50, 52, 54 and 56 on inner and outer faces of the stock 40 and 42. The stock 40 and 42 slides into the joint maker 10 with the grooves 50, 52, 54 and 56, receiving the cleats 26, 28, 30 and 32. Each of the cleats provides for frictional engagement in each of the slots. The rigidity of the resultant structure is determined by varying dimensions such as the length of the connecting member 20, or the length and positioning of the arms 12, 14, 16 and 18. Connecting member 20 positions and butts up to the end of the stock 40 or 42 providing for yet additional stability.

For constructing short lengths of stock together such as in drawer assembly, the grooves are positioned as described within cleats 26-32 and exert the required amount of frictional engagement to exact a solid fit joint. It can be seen that a given amount of frictional engagement pressure along relatively longer lengths will multiply directly in proportion to the length of stock to be engaged in the respective joining maker cleats and that a somewhat greater amount of pressure would be required to slide the joint maker over the length of a grooved sheet of plywood paneling material. For insertions of large proportions, grooves 50, 52, 54, and 56 in the stock 40 and 42 position slightly inwardly towards the rear end of the stock to alleviate the need for excess installation pressure which would otherwise be required for installation and the overcoming of built up longitudinal surface tensions to be overcome.

While the embodiment of the joint maker 10 shown in FIGS. 1 and 2 joins the stock 40 and 42 at a substantially right angle, any desired angle can be achieved by another embodiment of the device as shown in FIGS. 3-8.

Figure 3:
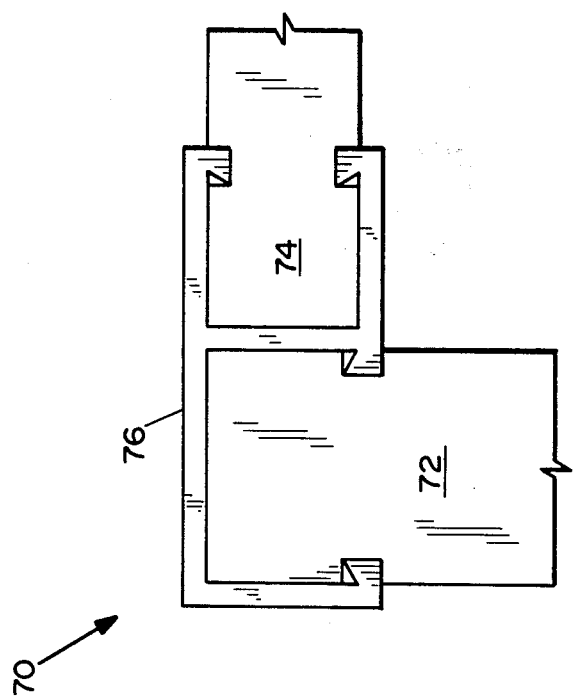
FIG. 3 is a top view of a second embodiment of a joint maker.

FIG. 3 illustrates a top view of a second embodiment of a joint maker 70 where the two particular pieces of stock are of different sizes. Particularly, the stock 72 illustrated in the drawing is of a different width than the stock 74, requiring a longer section 76 of the joint member.

Figure 4:
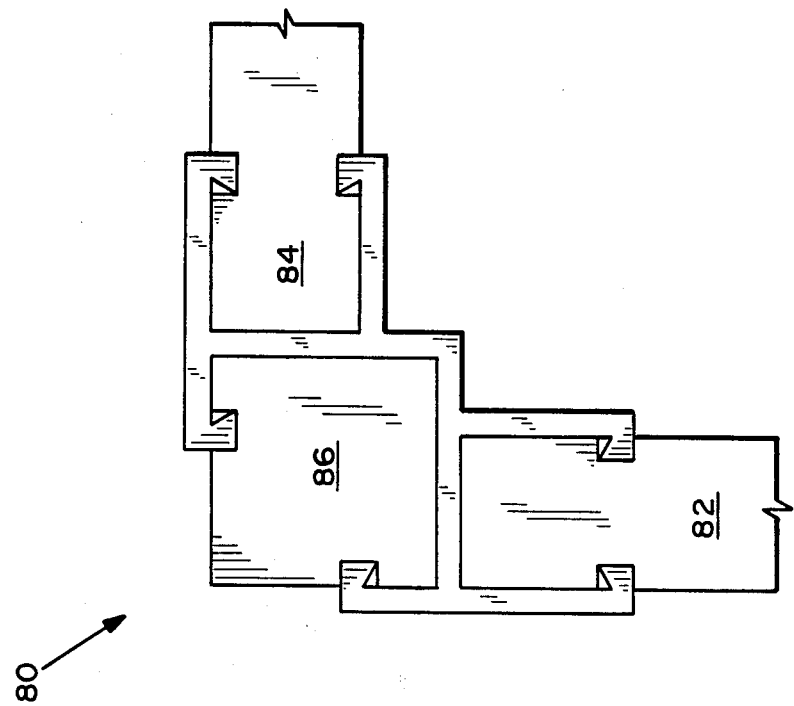
FIG. 4 is a top view of a third embodiment of a joint maker.

FIG. 4 illustrates a top view of the third embodiment of the present invention 80 where the joint maker engages about stock 82 and 84 about a piece of stock 86. In effect it engages to three different pieces of material.

Figure 5:
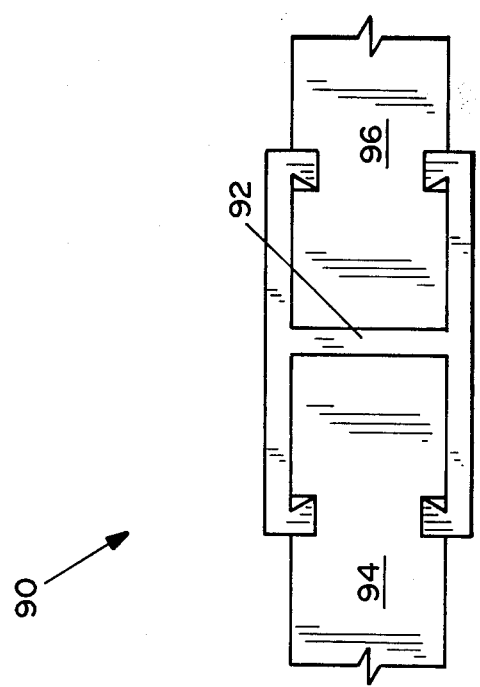
FIG. 5 is a top view of a fourth embodiment of a joint maker.

FIG. 5 illustrates a top view of the fourth embodiment of a joint maker 90 where the arms are parallel and common about an interconnecting member 92 to join stock 94 and 96. This provides for engaging of stock and joining of stock together in essentially a plane.

Figure 6:
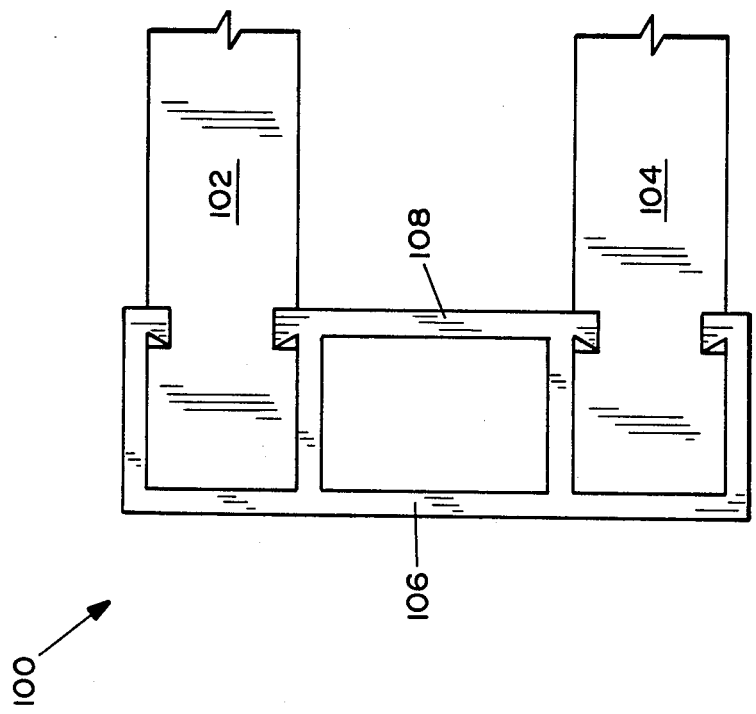
FIG. 6 is a top view of a fifth embodiment of a joint maker.

FIG. 6 illustrates a top view of the fifth embodiment of joint maker 100 for joining stock 102 and 104 parallel to each other and spaced at a particular distance. The spacing is provided by common interconnecting members 106 and 108. Of course, the stock when joined would not have to be parallel with respect to each other, it could be joined at an angle.

Figure 7:
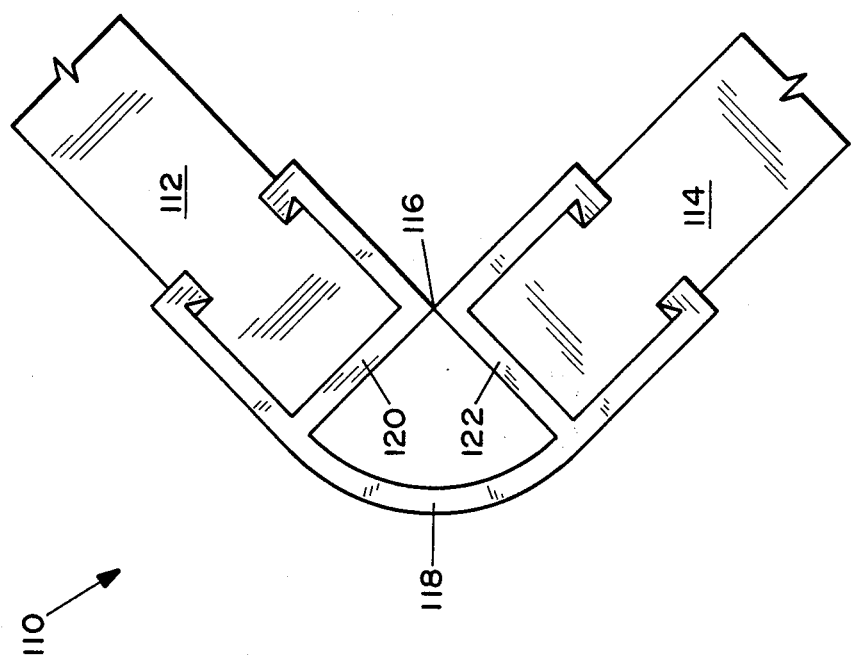
FIG. 7 is a top view of a sixth embodiment of a joint maker.

FIG. 7 illustrates a top view of the sixth embodiment of joint maker 110 for engaging stock 112 and 114 at an angle about a common point 116 with a curved interconnecting member 118 as well as interconnecting members 120 and 122. Of course, interconnecting member 118 could also be planar opposed to be curved.

Figure 8:
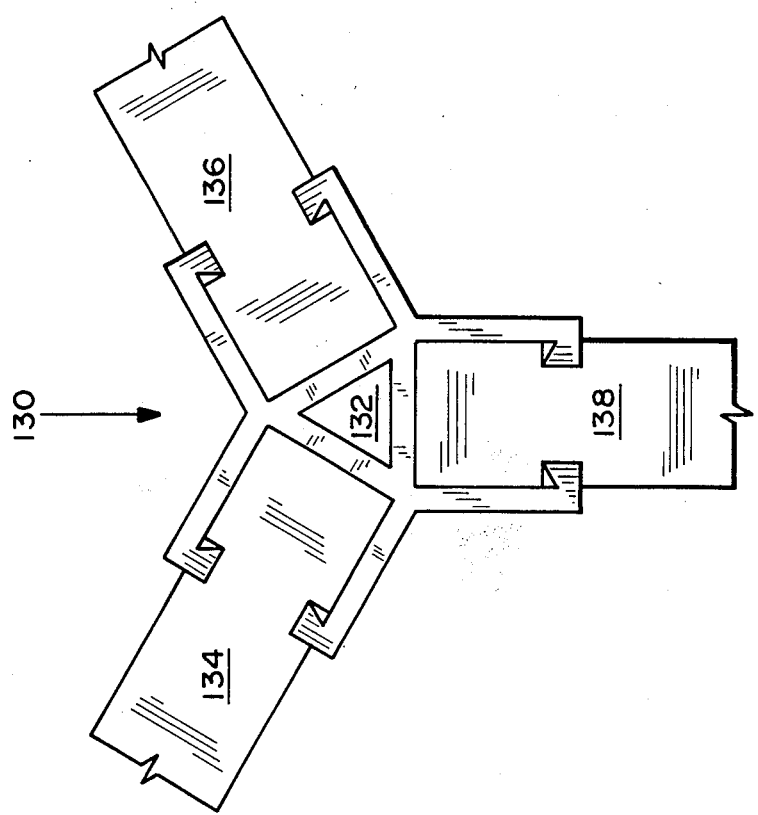
FIG. 8 is a top view of a seventh embodiment of a joint maker.

FIG. 8 illustrates a top view of the seventh embodiment of joint maker 130 including an equilateral triangle 132 by way of example and for purposes of illustration only where arms extend away from each side of the equilateral triangle 132 for joining stock 134, 136 and 138.

The above embodiments are not to be construed as being limiting of all of the teachings of the embodiments as other embodiments certainly are within the disclosure, scope and teachings of the invention.

Various modifications can be made to the present invention without departing from the apparent scope thereof.

I claim:
1. Joint maker for joining at least two pieces of stock, each piece of stock with opposing configured like grooves comprising:
   a. at least two opposing angled inwardly extending cleat means, each of said cleat means including an expanding section which angles inwardly;
   b. arm means supporting each of said cleats; and,
   c. at least one interconnecting member means supporting and connecting said arm means for a captured area between said arm means and said interconnecting member means, each of said cleat means diverges inwardly toward said interconnecting member means providing for engagement within opposing grooves of said stock.

2. Joint maker of claim 1 wherein at least one of said arm means are at right angle with respect to an other of said arm means.

3. Joint maker of claim 1 wherein said arm means are parallel to each other.

4. Joint maker of claim 1 wherein each pair of said arm means are parallel and spaced with respect to each other.

5. Joint maker of claim 1 wherein said arm means are at an angle with respect to each other.

6. Joint maker of claim 1 wherein said interconnecting member means is curved on one side.

7. Joint maker of claim 1 wherein said interconnecting member comprises an equilateral triangle and pairs of arm means extend outward from each end of said triangle.

* * * * *